Feb. 18, 1936. F. A. HEATH Re. 19,860

OIL BURNING FURNACE

Original Filed Feb. 10, 1928 2 Sheets-Sheet 1

INVENTOR
Forrest A. Heath
BY
Emil C. Kleau
ATTORNEY

Feb. 18, 1936. F. A. HEATH Re. 19,860
OIL BURNING FURNACE
Original Filed Feb. 10, 1928 2 Sheets-Sheet 2
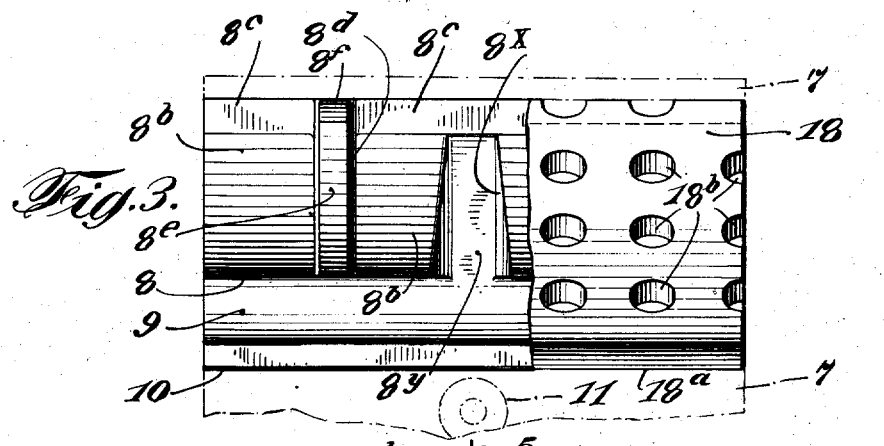
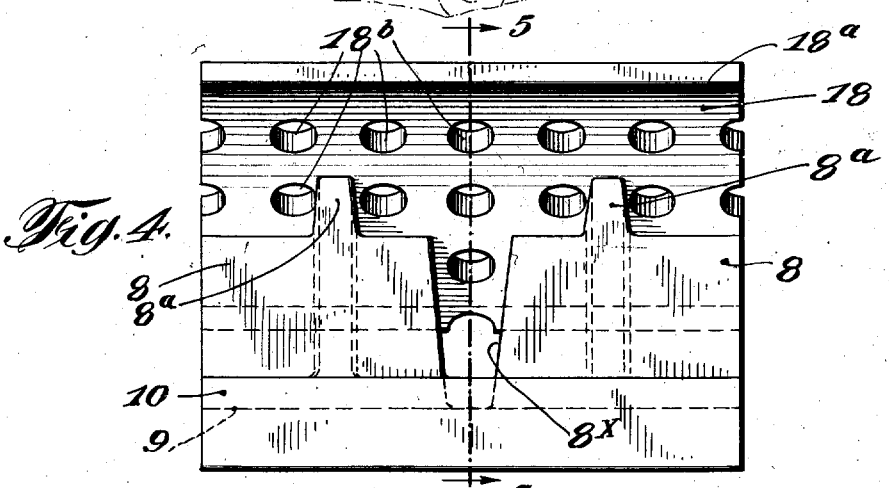
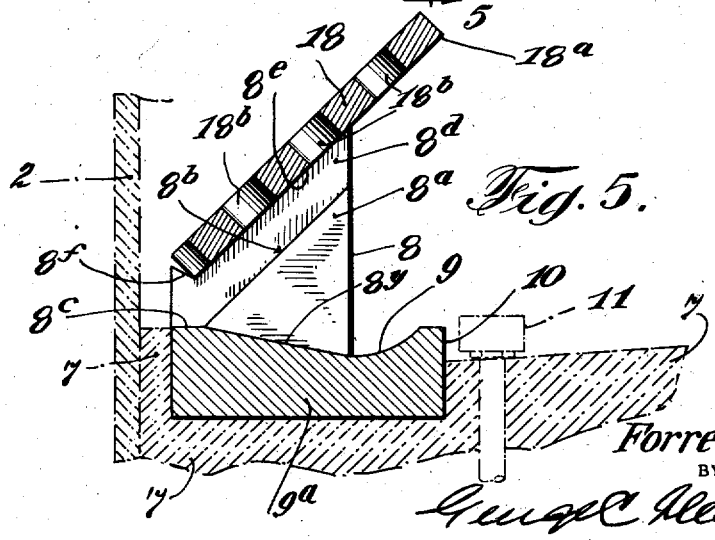
INVENTOR
Forrest A. Heath
BY
George C. Alexander ATTORNEY Reissued Feb. 18, 1936 Re. 19,860

UNITED STATES PATENT OFFICE 19,860

OIL BURNING FURNACE

Forrest A. Heath, Upper Montclair, N. J.

Original No. 1,886,675, dated November 8, 1932, Serial No. 253,271, February 10, 1928. Renewed March 12, 1930. Application for reissue October 25, 1934, Serial No. 750,024

35 Claims. (Cl. 158—4)

My present invention is related to that set forth in my companion application Serial No. 253,270, filed February 10, 1928 now Patent No. 1,979,465, granted November 6, 1934. It concerns oil burning apparatus of the class in which metered, and more or less mixed oil and air are sprayed, preferably centrifugally above a refractory hearth that closes in the lower end of a fire box and more specifically to apparatus having the oil projecting means and the hearth organized and operating in such combination that in normal full operation as well as at starting, the flame line or region where active combustion is precipitated is localized adjacent the periphery of the hearth which thus functions as the "burner". My present invention also contemplates the use in such a combination of certain features of my prior invention, disclosed and claimed in said companion application, including some of the features of the hearth, which are herein claimed only in combination with certain modifications and additions whereby my present hearth is even better adapted to improve the certainty and speed of ignition; to lessen the danger of having the ignited oil flame put out by being smothered in excess gas evolved at starting; and, in normal full operation, to more certainly localize at the periphery, the zone where active combustion is precipitated.

One feature of said application adapted to my present invention concerns having the periphery of the hearth formed with vertical impingement surfaces of fire brick or the like, adapted to afford catalytic surfaces to precipitate combustion at the periphery after the refractory material gets highly heated in normal running. One or more such impingement surfaces extend upward to or above the highest horizontal level to which the oil can be projected by the projecting apparatus, so that most of the unatomized drops of the projected oil impinge thereon. In my prior application, this impact and ignition wall is closely adjacent the wall of the fire box and operates like a burner from which the flame rises in contact with said fire box wall. My present invention contemplates rearrangements and additions whereby this somewhat primitive burner is evolved into a more definite type of burner adapted to discharge flame more directly on the wall to be heated. One feautre is spacing this wall inward so as to leave a small space between it and the wall to be heated. It has been found that such rear space when properly designed, is highly important as a means for deflecting the blast of flame and combustible mixture into contact with the wall of the furnace. In practice, the combustible draft from the rotary projector is deflected upward by the impact and ignition wall so that it shows a tendency to curl back away from the wall toward the center portions of the fire box, but it may be readily understood that when such upward draft blast passes the upper margin of a wall having a rear space, the blast tends to draw a vacuum in said space, thereby causing the flame and combustible mixture to curl or eddy back behind the impact wall. Because of such operation, said space may be converted into a sort of reverberatory furnace by adding a refractory wall adjacent the rear face of the impact wall. Thus arranged, the adjacent faces become white hot, promoting perfect combustion, even though the flame and draft therefrom pass immediately into contact with the relatively cold walls of the water leg of the boiler. While the vacuum and eddy producing effect of the space behind the impact wall is inherent, my present invention includes the further feature of having the spaced apart cooperating refractory wall, forwardly sloping and provided with rearwardly directed reticulations through which the flame may be definitely directed upon the wall to be heated. The space adjacent the front of this cooperating refractory wall, in reverberatory relation to the rear surface of the impact wall becomes a hot gas generating region, and if the rear wall is forwardly sloping, the reticulations will cause the rear face to function like a multiple gas jet burner, the jets whereof are directed against the water leg to be heated. In the latter particular it is analogous to a Welsbach mantle when over-supplied with gas and air mixture.

In the form shown, the rear wall of this reverberatory space extends forward far enough to overhang the vertical impact surface, tending to positively deflect the flame and gas mixture rearwardly behind the impact wall, in addition to the above described induction or vacuum effect whereby the flame and gases naturally tend to curl and eddy behind the wall.

As in my companion case, I may use one or more collecting gutters or grooves adjacent the base of the impingement surface, said gutter or gutters being of cross section sufficient to hold all of the unignited oil that can collect during the starting period. This peripheral gutter may be a pronounced groove, of depth dependent on the area of the impingement surface draining thereto, so that the exposed top surface of the oil collected therein is of relatively small area.

Another feature cooperating well with the collecting gutter, but which may be sufficient in itself, is to provide for an out drainage of the hearth downward from the oil projector to the periphery. Preferably, the upper surface of the hearth is sloped so that it will be close to but substantially out of range of the trajectory of the lowest part of the projected oil. Where such down slope hearth is used, it forms a collecting annulus or gutter where it meets the base of the vertical or upwardly extending surface of a peripheral impact wall. In the present case, the down slope hearth drains into such a collecting annulus adjacent a very low vertical surface, the main impact wall and its gutter being further on toward the periphery. It is just as well or even better to have the drainage from the hearth into a gutter. In either case, the down slope plus the gutter mutually cooperate to produce the best results, the down slope tending to keep the hearth free from impingement of unignited oil and facilitating outward drainage of any that does impinge, while the gutter tends to minimize the exposed surface of the oil collected therein.

As explained in my companion application, this makes it possible to start with the oil projector projecting only the amount of oil necessary for normal running and yet accumulate at the periphery where it is to be ignited, an ample supply of oil, in even less time than would be possible by an over-supply of oil projected upon the usual up-slope or horizontal hearth which does not have any peripheral gutter. Thus the oil is concentrated at the desired ignition point so that it it readily ignited. Moreover, after it is ignited, the excess oil volatilizes gradually from the surface and is consumed. There is no large area of oil on he adjacent hearth, where it would be volatilized by the flame in quantities sufficient to smother the growing flame and put out the pilot light or ignition torch.

The above and other features of my invention will be more evident from the following description in connection with the accompanying drawings, in which Figure 1 is a vertical sectional view of the hearth and burner, the surrounding fire box and water leg;

Figure 1*a* is an enlarged sectional detail showing more clearly and fully the fan and draft arrangements of the burner head;

Figures 3 and 4 are enlarged elevations of the refractory burner structural elements; and Figure 5 is a section on the line 5—5, Figure 4.

Figure 1:
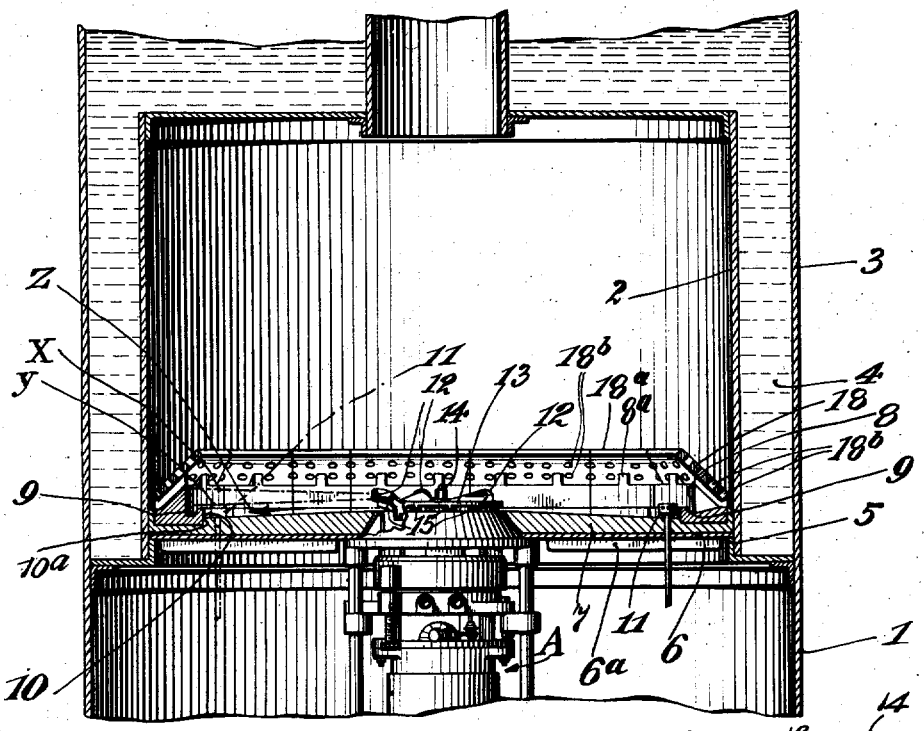

The furnace to be heated is shown in Figure 1 as including a wall or casing 1, closing in a space which may be approximately the same as the ash pit space of an ordinary coal fire furnace. This supports the furnace which may be of any desired construction, the essential parts shown in Figure 1 being the wall 2 closing in the fire box and an outer wall 3 affording an interspace 4 for the water or air to be heated or boiled, as the case may be. An annular ledge 5 supports a plate or metal hearth pan 6 stiffened by radial ribs, 6*a*. This supports a refractory hearth 7 through which projects an air and oil projector conventionally indicated at A.

The hearth is formed at its periphery with the vertical fuel impingement and ignition wall 8 having at the base thereof an oil collecting gutter, in this case a groove 9 the depth of which is about equal to its width.

In the present case, the hearth elements are set so that there is a slightly projecting vertical surface 10 just inside of and parallel with the gutter 9 which is at the foot of the main impingement and ignition wall 8. When so set, as it sometimes is, on hearths of small diameter, and when used in combination with the outwardly down sloping hearth, any drainage from the hearth will be to the annular collecting space 10*a* at the foot of this wall. It will be understood, however, that in many cases the rim of the gutter 9 will be set flush with the upper surface of the hearth.

Ignition torches 11, 11 are set in position to discharge ignition flame across the gutter 9 and against the ignition wall 8, and if there is a smaller wall 10 as shown, part of the flame will play upon this wall also.

Various examples of oil and air projectors suitable for my purpose are now well known. One is the oil projector invented by Homer A. Tiffany, for which application for letters patent has been or is about to be made, and another is set forth in my application Serial No. 47,709, filed August 3rd, 1925, which has resulted in Patent No. 1,707,474, issued April 2, 1929. The former is the one conventionally indicated herein.

Figure 1A:
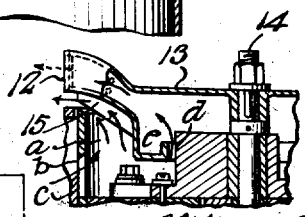

The oil is centrifugally discharged in an extremely fine spray or vapor through nozzles 12, supplied through a head 13 mounted on vertical shaft 14 which is an extension of an armature shaft of an electric motor contained in the casing A. This motor is of the usual construction and rotates the head at the usual high speed to project the oil from the nozzles 12, 12, in a trajectory, the upper and lower regions of which are indicated in a general way by the dotted lines *x* and *y* respectively. The head carries fan blades 15 creating a powerful draft below the trajectory of the oil as suggested by the arrow *z*. As shown in Figures 1 and 1*a*, there are ten or a dozen fan blades 15 carried by the under face of the head 13. These constitute a large volume fan tending to create a vacuum in the interior space *a*. The four nozzles 12 constitute another fan creating suction at *e*, and through annular passage *d* this suction takes effect in the same space that the fan 15 draws from. The air inlet to this space *a* is through a slot *b* communicating with the ash pit. The cross section of this slot may be adjustably decreased or increased by vertical slide *c*. Thus, the many blades 15 and the four nozzles 12 constitute two fans drawing in parallel from the same source. The respective suction effects of these two fans are very nearly the same, but the amount of air delivered through 12 is much smaller than delivered through 15, because the flow section of the four little nozzles is very much less than that of the annulus through which blades 15 discharge.

In operation, oil is supplied to the trough *e* through a suitable interior nozzle not shown. Centrifugal force causes a film of this oil from trough *e* to creep up the walls and ultimately to be thrown off as a fine spray projected from the rear lips of the four nozzles 12. Centrifugal force also causes a relatively small volume of air to be projected through these nozzles 12 while a much larger volume of air is being projected by the fan blades 15. The nozzles project substantially above the plane of the top plate 13 of the rotor. Consequently, said plate, together with the upwardly projecting surfaces of the nozzle, constitute in effect a third fan whereby hot products of combustion are projected in the same horizontal plane with the spray. The projected products of combustion and the air enveloping the spray lose velocity more quickly than the spray, so that the spray tends to cut through the paths of the former. Thus the composite draft produced by the nozzles consists of a mixture of hot products of combustion, spray and a small percentage of air. When this composite mixture strikes the periphery of the hearth, the spray is further atomized and mixed with the primary air and gas and also with the air from the fan blades. These easily ignite, at starting, and when the apparatus is in full operation so that the refractory impact surfaces are at high heat, the combustion at the periphery is substantially perfect. The oil and air supplies to the burner, as also the means for metering the same, form no part of my present invention and are not shown. Similarly, the means for controlling supply of gas to the ignition torches 11 may be of any known or usual construction and are not shown. The important features are that the ignition torch nozzles 11 are located inside the circumference of the collecting groove and the flame therefrom impinges along the ignition wall, preferably in the same direction that the rotary head tends to rotate the body of air or gas within the fire box.

I have discovered by many experiments that an outward down slope for the hearth of approximately one-half inch to the foot is sufficient to keep the upper surface below the trajectory of the oil, even when the diameter of the fire box is a maximum. As a specific illustration of preferred construction, I may note that an eight-inch rotary head 12, 13, may be utilized for fire boxes of widely varying diameter simply by varying the metering of the oil and gas, a uniform running speed of, say, 1,700 revolutions per minute being maintained for all sizes of furnaces and all degrees of heat. Where such a head is used in a fire box having a hearth only 24 inches in diameter, the oil only has to be thrown 8 inches. In such a case, a slight down slope to the hearth is desirable, although the distance is so short that the oil will certainly clear the hearth, regardless of whether the upper surface of the hearth is horizontal or is slightly sloping in either direction. For such small diameters, the collecting groove alone may be sufficient without the slope. With greater diameters, the outward down slope is progressively of greater importance, but for all sizes of hearth up to say, 78 inches in diameter, the standard outward down slope of one-half inch to the foot is sufficient.

So far as concerns the main impact surface or surfaces and the gutter, it will be recognized that they correspond to similar parts in my companion application, but as above described their functioning after they get hot, in full normal operation, is combined with and modified by additional parts and features of construction whereby the simple wall and groove burner becomes more a gasifying and mixing region furnishing gas to and through other elements which have a more characteristic burner function.

Figure 2:
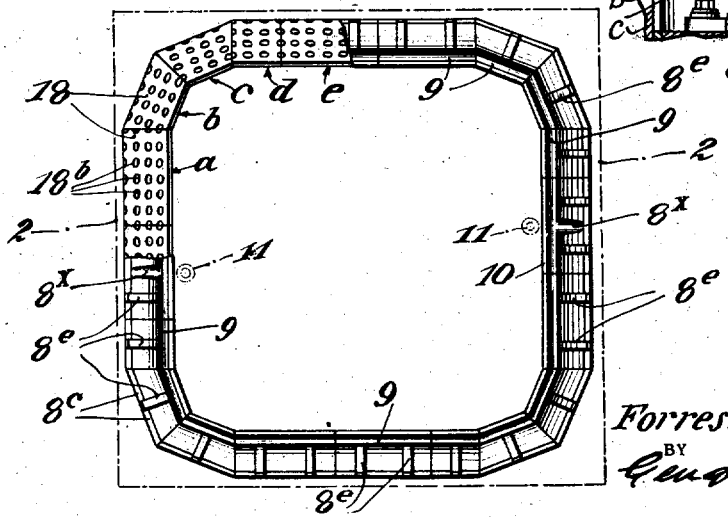
Figure 2 is a plan view of the burner.

The entire peripheral construction which, together with the hearth proper and the ignition wall may be said to constitute a complete hearth structure, is built up of relatively short molded sections of fire brick or other refractory catalytic material. As the cross section is substantially uniform except at one point to be mentioned hereafter, these sections may be made as standard molded units which may be assembled to fit any desired diameter or shape of furnace. In the form illustrated in Figure 2, the fire box is square and similar units in varying lengths are sawed or otherwise formed to fit as at *a'*, *b'*, *c'*, *d'*, etc. As shown on Sheet 2 of the drawings, the units preferably comprise a base member 9*a*, affording the gutter 9 and affording also a support for an integral upright element 8*a*. In the rear of this is a relatively small space or cavity arranged so as to be vacuumized by the draft deflected upward by impinging on the front wall of said element, whereby in normal operation the flame and combustible mixture tends to curl and eddy backward into said space, as above described. In the form shown, the rear face 8*b* slopes downward at a relatively steep angle to a flat surface 8*c* and has integral therewith upstanding ribs 8*d*, affording a support surface 8*e*, preferably parallel with 8*b*, and a ledge or stop, 8*f*.

In this form, the cooperating reverberatory surface is afforded by utilizing the support surface as a spacer and support for a super-structure including a refractory burner slab 18, sloping upward and projecting over the wall 8 a considerable distance so that its free edge 18*a* is vertically beyond the gutter 9. This slab has burner passages or reticulations 18*b*.

The relative areas of the surfaces, as well as the area and angle of the overhang 18*a* admits of considerable variation, but the object is first to intercept all of the unatomized drops upon the refractory faces presented toward the center of the hearth and while most of it is preferably received upon the surface 8 and drains directly into the gutter 9, it is evident that scattering drops may be intercepted by the burner plate 18 and if the hearth projects as at 10, some drops may fall on this vertical surface. Drops striking above the surface 8 will naturally drain or be blown by the air draft rearward to the space behind the burner structure. For this reason, I prefer to have the area surface 8*f*, Figure 5, spaced slightly apart from the fire box wall 2. Any oil draining to this pocket will be practically out of the field of operations during the starting period, but after the apparatus is in full operation, this oil will be volatilized and burned so that no great excess accumulates. In order to provide a path of escape for any such excess I arrange a slot-like passage 8*x*, whereby this space drains down the surface 8*y* into the gutter 9 in front of the ignition surface 8.

Another factor controlling the proportions of the parts, particularly the angle and overhang of the burner plate at 18*a* and the height of the supports 8*e* is to have the horizontally discharged blast from the projector pocketed and deflected so that it will be discharged partly through the burner reticulations 18*b*, and partly downward along the surface 8*b*, directly to the fire box wall 2.

These things will be further explained from the operation of the apparatus which may be described as follows:

The usual controls are employed whereby power is supplied to rotate the head 13 to deliver a predetermined metered supply of oil along the lines *x*, *y* and air or air and hot gas, as indicated by the arrow *z*, the oil projected against ignition wall 8 collecting in groove 9. Some of it may be projected under or through the slab 18, but this drains rearwardly as described above. The maximum exposed surface of oil is therefore practically limited to the area of the exposed burner surfaces plus the upper surface area of the oil in groove 9. All of the oil being concentrated in the ignition region, the ignition torches quickly ignite the oil around the entire periphery, but any increased oil surface that such ignition brings into play, is above and beyond the zone of the ignition surface and gutter, there being little, if any, oil on the upper surfaces of the hearth. Consequently, the igniting operation is quick and uniformly progressive until the entire periphery flames. Any oil on the overhang or undersurface of burner plate 18 is in the best possible position to intercept and be vaporized by the growing blaze from below.

It will be noted that during the ignition period, the combustible blast mixture is deflected through the burner and cleared of excess oil drops carried thereby, thus tending to correct the natural overrichness of the mixture at this stage when so much oil is being evaporated from the wet surfaces. The burner plate 18 and particularly the overhang portion thereof, being thin, quickly become incandescent, as also the thin upper tips and edges of the projecting supports 8d. Later on, all of the surfaces become hot enough so that in normal running all oil droplets are vaporized immediately upon impact with the burner surfaces.

Another very important function of the burner plate is that of a homogenizing mixer. The blast from the projector nozzles is more or less finely subdivided or atomized spray. The air is delivered below the spray by the fan and naturally tends to cross the path of the spray and forms with it a combustible blast that carries on its upper surface an admixture of burned out gas rich in carbon dioxide. This three-fold mixture projected against the burner is thoroughly baffled and homogenized as part of it is driven through the reticulations of the burner plate and part is deflected downward and rearward under the plate. The advantage of such a homogeneous mixture is well known and the special advantage of the carbon dioxide diluent is also well known as conducive to a voluminous flame, of less intensity but much greater heating effect as concerns the fire wall 2. In normal full operation, my present invention makes it possible to cut down the air to just the amount needed for complete combustion with the result that the flame may be almost invisible, like the blue part of the flame from a well regulated Bunsen burner. An important feature is that this flame is directed through the burner plate and downward under the plate directly into contact with the wall 2, and starts its upward licking progress, undisturbed by the blast from the fan.

The ignition torch may and frequently does cease to be flaming when the oil is being rapidly vaporized and burned in close proximity thereto. There is no disadvantage because the torch gas is burned along with the oil vapor so long as normal operation continues. The remarkable point is that when the oil projector is turned off and the oil flame dies down, it naturally shrinks down behind the ignition wall to the surplus oil there collected and then follows the draining oil through the slot 8x into the groove, thus relighting the ignition torch before itself becoming extinguished. Or if the ignition torch is intermittently operated by a pilot light projecting upward in the groove 9, as in my companion application, it will be the pilot that is relighted in this way.

While I have shown the fire box as being square, it is to be understood that in practice they are often oblong or circular. In such cases the peripheral burner preferably follows the fire box wall in the relation indicated in cross section in Figure 1, although it is desirable to have it cut across the extreme angles of the corners as shown.

I claim:

1. Apparatus of the class described, including a furnace, a hearth closing in the bottom thereof, and a centrifugal projector radially discharging a composite draft of air adjacent the upper surface of the hearth and oil above the air, said projector and hearth being designed and operating to maintain combustion in a peripheral zone of impact and disturbance of the projected composite draft; and, extending along said peripheral zone, a homogenizing burner of refractory material adapted to intercept the path of the projected oil, an oil collecting gutter in drainage relation to said homogenizing burner, a rear oil collecting gutter behind said burner, a drainage passage draining from said rear gutter to the front of said wall, and a re-ignition gas jet in position to be ignited by flame communicated through said passage when normal operation is discontinued.

2. Apparatus of the class described, including a furnace having upright walls, a hearth closing in the bottom thereof, a centrifugal projector radially discharging a composite draft of air adjacent the upper surface of the hearth and oil above the air, and a homogenizing gasifying burner of refractory material adjacent the upright furnace walls all designed and operating to maintain combustion in a peripheral zone of impact and disturbance of the projected composite draft; said burner being formed with wall elements having upwardly extending, inwardly presented impact surfaces adapted to intercept the path of the projected oil and deflect the draft upward, an oil collecting gutter in drainage relation to said impact surfaces, said burner having also transverse passages and an overhanging deflector element arranged to deflect the upward draft outward against said furnace walls.

3. Apparatus of the class described, including a furnace having an upright wall, a hearth closing in the bottom thereof, a centrifugal projector radially discharging a composite draft of air adjacent the upper surface of the hearth and oil above the air, and a homogenizing gasifying burner of refractory material adjacent said upright wall, all designed and operating to maintain combustion in a peripheral zone of impact and disturbance of the projected composite draft; said burner being formed with wall elements having upwardly extending inwardly presented impact surfaces adapted to intercept the path of the projected oil and deflect the draft upward, a rear oil collecting gutter behind said burner, and a drainage passage draining from said rear gutter to the front of said wall.

4. Apparatus of the class described, including a furnace having upright walls, a hearth closing in the bottom thereof, a centrifugal projector radially discharging a composite draft of air adjacent the upper surface of the hearth and oil above the air, and a homogenizing gasifying burner of refractory material adjacent the upright furnace walls, all designed and operating to maintain combustion in a peripheral zone of impact and disturbance of the projected composite draft; said burner being formed with wall elements having upwardly extending, inwardly presented impact surfaces adapted to intercept the path of the projected oil and deflect the draft upward, said burner having also transverse passages and an overhanging deflector element arranged to deflect the upward draft outward against said furnace walls.

5. Apparatus of the class described, including a furnace having an upright wall, a hearth closing in the bottom thereof, a centrifugal projector radially discharging a composite draft of air adjacent the upper surface of the hearth and oil above the air, and a homogenizing gasifying burner of refractory material adjacent said upright wall, all designed and operating to maintain combustion in a peripheral zone of impact and disturbance of the projected composite draft; said burner being formed with wall elements having upwardly extending, inwardly presented impact surfaces adapted to intercept the path of the projected oil and deflect the draft upward, said burner having also a burner plate having reticulations through which the draft flows.

6. Apparatus of the class described, including a fire box, a refractory hearth structure including a hearth closing in the bottom thereof and a rotary head comprising a centrifugal oil sprayer and an air projector discharging horizontally below the oil sprayer, above the hearth, said hearth having a substantially unobstructed upper surface lying below the level of normal projection of the oil spray, designed and operating to initiate combustion adjacent the periphery of the hearth, said hearth structure having adjacent the periphery an upwardly extending refractory ignition wall, a depression at the base of said wall for collecting oil splashing or draining downward from the front face thereof and drainage means formed in the wall whereby oil projected beyond the impact face thereof may drain to said front oil collecting space.

7. Apparatus of the class described, including a furnace having upright walls, a hearth closing in the bottom thereof, a centrifugal projector radially discharging air and oil over the upper surface of the hearth and creating a draft that approaches said upright walls, and a homogenizing gasifying burner adjacent the upright furnace walls, all designed and operating to maintain combustion in a peripheral zone of impact and disturbance of the projected air and oil; said burner being formed with wall elements having inwardly presented impact surfaces shaped and disposed to intersect the path of the projected oil and deflect the draft upward, said burner having also a deflector element arranged to deflect the draft against said furnace walls.

8. Apparatus of the class described, including a furnace having upright walls, a hearth closing in the bottom thereof, a centrifugal projector radially discharging a composite draft of air adjacent the upper surface of the hearth and oil above the air, and a homogenizing gasifying burner of refractory material adjacent the upright furnace walls, all designed and operating to maintain combustion in a peripheral zone of impact and disturbance of the projected composite draft; said burner being formed with wall elements having upwardly extending, inwardly presented impact surfaces adapted to intercept the path of the projected oil and deflect the draft upward, said burner having also an upper deflector element supported by spacing elements to afford transverse passages arranged to deflect the upward draft outward against said furnace walls.

9. Apparatus of the class described, including a furnace having upright walls, a hearth closing in the bottom thereof, a centrifugal projector radially discharging a composite draft of air adjacent the upper surface of the hearth and oil above the air, and a homogenizing gasifying burner of refractory material adjacent the upright furnace walls, all designed and operating to maintain combustion in a peripheral zone of impact and disturbance of the projected composite draft; said burner being formed with wall elements having upwardly extending, inwardly presented impact surfaces adapted to intercept the path of the projected oil and deflect the draft upward, said burner having also an upper overhanging deflector element having reticulations supported by spacing elements to afford transverse passages arranged to deflect the upward draft outward against said furnace walls.

10. Apparatus of the class described, including a furnace having upright walls, a hearth closing in the bottom thereof, a centrifugal projector radially discharging a composite draft of air adjacent the upper surface of the hearth and oil above the air, and a homogenizing gasifying burner of refractory material adjacent the upright furnace walls, all designed and operating to maintain combustion in a peripheral zone of impact and disturbance of the projected composite draft; said burner being formed with wall elements having upwardly extending, inwardly presented impact surfaces adapted to intercept the path of the projected oil and deflect the draft upward, said burner having also an outwardly and downwardly sloping burner plate arranged to deflect the upward draft outward against said furnace walls.

11. Apparatus of the class described, including a furnace having upright walls, a hearth closing in the bottom thereof, a centrifugal projector radially discharging a composite draft of air adjacent the upper surface of the hearth and oil above the air, and a homogenizing gasifying burner of refractory material adjacent the upright furnace walls, all designed and operating to maintain combustion in a peripheral zone of impact and disturbance of the projected composite draft; said burner being formed with wall elements having upwardly extending, inwardly presented impact surfaces adapted to intercept the path of the projected oil and deflect the draft upward, said burner having also passages for permitting outward flow of the draft, and a burner plate supported above said impact surfaces by spacing elements to afford transverse passages arranged to direct the upward draft outward against said furnace walls.

12. Apparatus of the class described, including a fire box, a refractory hearth structure including a hearth closing in the bottom thereof and a rotary head comprising a centrifugal oil sprayer and an air projector discharging horizontally below the oil sprayer, above the hearth, said hearth having a substantially unobstructed upper surface lying below the level of normal projection of the oil spray, all designed and operating to maintain combustion adjacent the periphery of the hearth, said hearth structure having adjacent the periphery an upwardly extending refractory ignition wall and above said wall a plate element and supports therefor, adapted to intercept oil projected by the oil sprayer.

13. Apparatus of the class described, including a fire box, a refractory hearth structure including a hearth closing in the bottom thereof and a rotary head comprising a centrifugal oil sprayer and an air projector discharging horizontally below the oil sprayer, above the hearth, said hearth having a substantially unobstructed upper surface lying below the level of normal projection of the oil spray, all designed and operating to maintain combustion adjacent the periphery of the hearth, said hearth structure having adjacent the periphery an upwardly extending refractory ignition wall and above said wall a plate element and supports therefor, adapted to intercept oil projected by the oil sprayer, and said wall having its upper surface draining outward toward the periphery.

14. Apparatus of the class described, including a fire box having upright walls, a refractory hearth structure including a hearth closing in the bottom thereof and a rotary head comprising a centrifugal oil and air projector discharging above the hearth, said hearth having a substantially unobstructed upper surface lying below the level of normal projection of the discharged oil, said hearth structure having adjacent the periphery a refractory wall with spaced-apart projections extending upwardly above said level, said refractory wall being arranged to afford impact surfaces in the path of said spray and surfaces presented rearwardly adjacent said upright walls of the fire box.

15. Apparatus of the class described, including a fire box having upright walls, a refractory hearth structure including a hearth closing in the bottom thereof and a rotary head comprising a centrifugal oil and air projector discharging above the hearth, said hearth having a substantially unobstructed upper surface lying below the level of normal projection of the discharged oil, said hearth structure having adjacent the periphery an upwardly extending refractory impact wall, a rearwardly extending face of which is adjacent but spaced apart from said fire box walls, in combination with a member affording supplemental refractory surfaces in reverberatory relation to said rearwardly extending face of said impact wall and affording spaced apart paths for escape of flame and combustible mixture from the reverberatory space into contact with said upright walls of the fire box.

16. Apparatus of the class described, including a fire box having upright walls, a refractory hearth closing in the bottom thereof and a rotary head comprising a centrifugal oil and air projector discharging oil and air draft over the hearth, all designed and operated to maintain combustion adjacent the periphery of the hearth, in combination with a refractory wall adjacent the periphery of the hearth, said wall including a face for impact of the discharged oil and upward deflection of the draft, and another face which extends toward said fire box walls, and a cooperating member affording supplemental refractory surfaces above and in reverberatory relation to the latter face of said impact wall and formed with spaced-apart passages for through flow of flame and combustible mixture from the reverberatory space outward and upward toward said walls of the fire box.

17. Apparatus of the class described, including a fire box having upright walls, a refractory hearth closing in the bottom thereof and a rotary head comprising a centrifugal oil and air projector discharging oil and air draft over the hearth, all designed and operated to maintain combustion adjacent the periphery of the hearth, in combination with a refractory wall adjacent the periphery of the hearth, said wall including a lower impact portion or element adapted to deflect the draft upwardly, and an upper spaced-apart portion affording rearwardly and downwardly inclined deflecting surfaces and formed and arranged to afford spaced-apart paths for rearward and upward escape of flame and combustible mixture toward said upright walls of said fire box.

18. Apparatus of the class described, including a fire box, a refractory hearth structure including a hearth closing in the bottom thereof and a rotary head comprising a centrifugal oil and air projector discharging above the hearth, said projector being of the high speed type and said hearth having a substantially unobstructed upper surface lying below the level of normal projection of the discharged oil, said hearth structure having adjacent the periphery refractory elements presenting upwardly and inwardly inclined surfaces and formed with passages for outward and upward through flow of flame and combustible mixture.

19. Apparatus of the class described, including a fire box having upright walls, a hearth closing in the bottom thereof and a rotary head comprising a centrifugal oil and air projector discharging oil and air draft over the hearth, all designed and operated to maintain combustion adjacent the periphery of the hearth, in combination with a burner structure adjacent the periphery of the hearth, in the path of the discharged oil and air draft, said structure including spaced-apart surfaces in reverberatory proximity and formed and arranged to afford paths for escape of flame and combustible mixture toward said upright walls of said fire box.

20. A flame concentrator and director of the character described, including a grill having a flame-directing aperture, a deflecting wall extending upwardly toward said aperture, a deflecting surface in front of said wall adapted to deflect an impinging draft upwardly into a draft passing above said deflecting surface toward said deflecting wall, and a mixing valley intermediate said deflecting wall and deflecting surface.

21. A flame concentrator and director of the character described, including a grill having a flame-directing aperture, a deflecting wall extending upwardly toward said aperture, a deflecting surface in front of said wall adapted to deflect an impinging draft upwardly into a draft passing above said deflecting surface toward said deflecting wall, and a vertical deflecting surface, extending transversely of said deflecting wall, intermediate said wall and aperture.

22. A flame concentrator and director of the character described, including a grill having a flame-directing aperture, a deflecting wall extending upwardly toward said aperture, a deflecting surface in front of said wall adapted to deflect an impinging draft upwardly into a draft passing above said deflecting surface toward said deflecting wall, a mixing valley intermediate said deflecting wall and deflecting surface, and a vertical deflecting surface, extending transversely of said deflecting wall, intermediate said wall and aperture.

23. In a fire box for oil burners of the character described, in combination, a hearth, a grill support disposed on the hearth adjacent its periphery, and grill members adapted to be disposed and supported in any selected places on the grill support, whereby the spacing of the grill members from each other may be varied, said grill members having apertured portions disposed above the surface of the hearth when the grill members are disposed on the grill support.

24. In a fire box for oil burners of the character described, in combination, a substantially annular hearth, and flame deflecting and concentrating grill members disposed on the hearth adjacent its periphery, said grill members having apertured portions inclining upwardly toward the center of the hearth and spaced vertical supporting walls or flanges beneath said apertured portions directed approximately endwise toward the center of the hearth.

25. In a fire box for oil burners of the character described, in combination, a substantially annular hearth, flame deflecting and concentrating grill members disposed on the hearth adjacent its periphery, said grill members having apertured portions inclining upwardly toward the center of the hearth and spaced flat vertical supporting walls or flanges beneath said apertured portions directed approximately endwise toward the center of the hearth, and an approximately annular grill support disposed on the hearth, said grill members being supported thereon.

26. In a fire box for oil burners of the character described, in combination, a substantially annular hearth, flame deflecting and concentrating grill members disposed on the hearth adjacent its periphery, said grill members having apertured portions inclining upwardly toward the center of the hearth and spaced flat vertical supporting walls or flanges beneath said flat portions directed approximately endwise toward the center of the hearth, and an approximately annular grill support disposed on the hearth, said grill members being supported thereon, said grill support comprising supporting units having deflecting surfaces facing toward the center of the hearth and adapted to deflect an impinging draft upwardly to and through the apertures of said grill members.

27. A fire box construction for oil burning furnaces of those types which are provided with centrifugally-acting distributing heads for discharging fuel droplets substantially radially, including a hearth extending around and outwardly from said distributing head and including an upstanding peripheral portion having an inner surface which intersects the path of the discharged fuel droplets at substantially right angles, and an inwardly upwardly inclined portion overhanging said inner surface.

28. In a liquid fuel burning apparatus, in combination with a combustion chamber having a hearth and a wall to be heated and a fuel impact member set upon the hearth adjacent said wall, means for projecting fuel and air toward said impact member at relatively high velocity, ignition means adjacent said impact member in the general path of fuel and air projection whereby a combustion zone is formed adjacent said wall, and a perforated structure mounted above said impact member between the projecting means and said wall, the perforations of said structure being arranged in the general path of fuel and air projection and discharging toward said wall, whereby the flame in the combustion zone is concentrated upon the wall in the vicinity of said perforated structure.

29. In a liquid fuel burning apparatus, in combination with a combustion chamber having a hearth and a wall to be heated, means for projecting fuel toward said wall, means for supplying a blast of air at relatively high velocity for admixture with said fuel to support combustion adjacent said wall, and means in the chamber for concentrating the heat of combustion upon said wall, said means comprising a device consisting of a base structure and disposed adjacent the wall with one side forming an upright impact surface facing the air blast, said device consisting also of a superstructure providing transverse passages or openings through which fuel and air may pass toward the wall, whereby the flame of combustion is shorter than would be produced by the high velocity air blast in the absence of said device.

30. A fire box construction for oil burning furnaces of those types which are provided with centrifugally-acting distributing heads for flinging fuel droplets outwardly, including a hearth extending around said distributing head and outwardly therefrom, and including an upstanding portion having an inner surface which intersects the trajectory of the fuel droplets at substantially right angles, an inclined portion overhanging said inner surface; and an inner, upwardly extending projection spaced a short distance from said upstanding portion and terminating below the trajectory of the fuel droplets and defining between itself and said upstanding portion a narrow depression adjacent the lower edge of said surface.

31. In a liquid fuel burning apparatus, in combination with a combustion chamber having a substantially horizontal hearth and an upright wall, fuel distributing means designed to project a fuel stream above said hearth and toward said wall, means for causing air to intersect the fuel stream adjacent said wall, a member providing a fuel impingement and mixing wall having a surface spaced inwardly from said chamber wall in the direction of said fuel distributing means, and a flame-controlling structure overhanging said impingement surface and extending past the latter toward said upright wall.

32. In a liquid fuel burning apparatus, in combination with a combustion chamber having a hearth structure including a hearth and a wall to be heated, means for projecting fuel and air toward said wall at relatively high velocity, ignition means adjacent said wall in the general path of fuel and air projection whereby a combustion zone is formed adjacent said wall, said hearth structure further including means projecting upwardly as a vertical continuation of the hearth and forming a fuel impingement surface adjacent said combustion zone in spaced relation to the said chamber wall, and means disposed between the upper part of said impingement surface and said wall to spread and shorten the flame produced in said combustion zone.

33. In a liquid fuel burning apparatus embodying a combustion chamber having a hearth and a heat absorbing wall and also embodying means for passing liquid fuel and air substantially horizontally through a portion of the combustion chamber at relatively high velocity over the hearth of said chamber toward the heat absorbing wall of said chamber, means forming an impingement surface spaced inwardly from said wall in the path of the liquid fuel and air, means for causing the fuel to burn adjacent said surface, and a flame controlling device of heat resistant material disposed across the space between said wall and said inwardly spaced impingement surface to thus form a reverberatory chamber, said device being constructed to spread the flame of combustion and to direct the same toward said heat absorbing wall and into said reverberatory chamber.

34. A liquid fuel burning apparatus comprising means forming an impingement surface designed to reach high temperature in operation, means for throwing liquid fuel substantially horizontally toward said impingement surface to homogenize and gasify said fuel, means for sweeping air for combustion against said surface at high velocity to thoroughly carburet the homogenized fuel, means for igniting the combustible mixture, and means disposed adjacent said impingement surface for baffling and spreading the burning mixture.

35. In a liquid fuel burning apparatus, in combination with a combustion chamber having a hearth and an upright wall adjacent the hearth periphery, means forming an impingement surface designed to reach high temperature in operation, said means being spaced horizontally from said upright wall to form therewith a chamber, means for discharging liquid fuel substantially horizontally toward said impingement surface to homogenize and gasify the fuel, means for sweeping air for combustion toward said surface at high velocity to thoroughly carburet the homogenized fuel, means for igniting the combined fuel and air, and baffling means disposed above said impingement surface and projecting into the upper part of the last-mentioned chamber, said baffling means constructed to direct part of the ignited mixture downwardly into said last-mentioned chamber.

FORREST A. HEATH.